United States Patent [19]
Sallen et al.

[11] Patent Number: 5,661,460
[45] Date of Patent: *Aug. 26, 1997

[54] DISTANCE DETERMINATION AND ALARM SYSTEM

[75] Inventors: Roy Sallen, Wayland; Walter James Budzyna, Whitinsville; Charles E. Sawabini, Carlisle, all of Mass.; Drew E. Sunstein, Hollis, N.H.

[73] Assignee: Secure Technologies, Inc., Boston, Mass.

[*] Notice: The term of this patent shall not extend beyond the expiration date of Pat. No. 5,589,821.

[21] Appl. No.: 570,866

[22] Filed: Dec. 12, 1995

Related U.S. Application Data

[63] Continuation-in-part of Ser. No. 355,041, Dec. 13, 1994, Pat. No. 5,589,821.

[51] Int. Cl.$^6$ ........................................... G08B 21/00
[52] U.S. Cl. .................. 340/573; 340/539; 342/127
[58] Field of Search ........................ 340/539, 573; 342/127

[56] References Cited

U.S. PATENT DOCUMENTS

| | | | |
|---|---|---|---|
| 2,148,267 | 2/1939 | Honore | 250/11 |
| 2,930,037 | 3/1960 | Jones | 343/105 |
| 3,144,645 | 8/1964 | McIver et al. | 342/127 |
| 3,714,650 | 1/1973 | Fuller et al. | 343/6.5 |
| 3,808,597 | 4/1974 | Hastings et al. | 343/105 |
| 3,967,277 | 6/1976 | Hastings et al. | 343/105 |
| 4,106,022 | 8/1978 | Last | 353/105 |
| 4,142,680 | 3/1979 | Oswald et al. | 235/92 |
| 4,238,726 | 12/1980 | Spence et al. | 343/112 |
| 4,260,982 | 4/1981 | DeBenedictis et al. | 340/539 |
| 4,675,656 | 6/1987 | Narcisse | 340/539 |
| 4,757,315 | 7/1988 | Lichtenberg et al. | 342/125 |
| 4,899,135 | 2/1990 | Ghahariiran | 340/573 |
| 4,978,946 | 12/1990 | Eyers | 340/573 |
| 5,021,794 | 6/1991 | Lawrence | 342/457 |
| 5,150,310 | 9/1992 | Greenspun et al. | 364/516 |

FOREIGN PATENT DOCUMENTS 2 246 891  2/1991  United Kingdom .

OTHER PUBLICATIONS

Powell: "Hyperbolic Origins"; The Journal of Navigation; vol. 34, No. 3, Sep. 1981.

*Primary Examiner*—Glen Swann
*Attorney, Agent, or Firm*—Bromberg & Sunstein LLP

[57] ABSTRACT

A system has a plurality of transceiver units, including a parent unit and one or more portable and wearable child units, for generating an alarm when a child transceiver unit is more than a predetermined distance away from a parent transceiver unit. The distance is determined by the difference in the phase of a reference signal from the time it is transmitted on an rf signal by a parent unit, received and retransmitted by a child unit, and then received again by the parent unit.

36 Claims, 7 Drawing Sheets

DISTANCE DETERMINATION AND ALARM SYSTEM

The present application is a continuation in part of U.S. application Ser. No. 08/355,041, filed Dec. 13, 1994, entitled "Distance Determination and Alarm System", now U.S. Pat. No. 5,589,821 issued Dec. 31, 1996; this related application is hereby incorporated herein by reference.

FIELD OF INVENTION

This invention relates to distance determination and alarm systems of the type having a plurality of transceiver units that utilize the phase delay of a reference signal modulating an rf signal to determine the distance between the units.

BACKGROUND ART

There are numerous examples of out of range alarm systems. Such systems typically include a parent unit and one or more, portable, child units adapted to be worn by a person. The child units typically transmit an RF signal which is received by the parent unit. The distance between the units is determined based on the strength of the signal received from a child unit. These systems often include some means of generating an alarm when the distance between the units exceeds a predetermined amount, as a means of notifying the monitoring personnel at the parent unit when the animal or person, or persons, wearing the child units are out of range.

These systems have proved unreliable because they rely on received signal strength as a means of determining distance. This calculation presumes that the signal will always emanate at the same strength, and that it will be attenuated as a function of distance in the same manner, regardless of the strength of the batteries used to power the child units, the physical surroundings of the area in which the system is used, the positions of the transmit and receive antennas, and weather conditions and other factors which cause differences in signal attenuation. Because there are always unknown factors which will, almost certainly, cause RF signals to attenuate differently, such systems are inherently unreliable.

SUMMARY OF INVENTION

The present invention provides an out of range alarm system having enhanced reliability and can perform under a wide range of signal conditions. The system has a plurality of transceiver units, including a parent unit and one or more child units, for generating an alarm when a child transceiver unit is more than a predetermined distance away from a parent transceiver unit. In accordance with a preferred embodiment of the invention, there is provided a first transceiver in a parent unit, and includes a first transmitter that provides an rf signal at a first carrier frequency, a signal generator for generating a first reference signal, a first modulator, coupled to the first transmitter, for modulating the first carrier with the first reference signal, and a first digital encoder for digitally encoding the modulated carrier with a digital signature to identify the output of the first transmitter. A second transceiver is in a portable child unit, of a size small enough to be worn by a child, and includes a second receiver, tuned to the first carrier frequency, for receiving a signal broadcast from the output of the first transmitter, a digital decoder for decoding the digital signature from the signal received by the second receiver and providing a decoded output, and an inhibitor arrangement, coupled to the digital decoder, for preventing transmission by the child unit unless the decoded output meets criteria stored in the child unit.

In this embodiment the child unit has a second rf transmitter, operative at a second carrier frequency, and having an output; a second modulator, coupled to the second rf transmitter and to the second receiver, for modulating the second carrier with a second reference signal having a prespecified phase relationship to the first reference signal as received by the second receiver. In addition the parent unit has a first receiver, tuned to the second carrier frequency, for providing an output of the demodulated second reference signal; a distance resolver, coupled to the first receiver and the signal generator, for providing an output signal dependent on the phase relationship, between the first reference signal and the demodulated second reference signal, that is indicative of the distance between the child unit and the parent unit; and an alarm, coupled to the distance resolver, triggered if the output signal from the distance resolver, exceeds a specified maximum distance.

In further embodiments, the child unit may have an emergency button for causing the generation of an alarm signal for transmission to the parent unit and a range selection switch accessible to the user for specifying the maximum distance.

BRIEF DESCRIPTION OF THE DRAWINGS

Other features of the present invention will be more readily understood by reference to the following detailed description, taken with the accompanying drawings, in which.

DETAILED DESCRIPTION OF SPECIFIC EMBODIMENTS

The present invention provides a system having a parent unit and one or more child units for generating an alarm at the parent unit, when a child unit is more than a predetermined distance from the parent unit. The parent unit has a transceiver including a transmitter for transmitting an rf signal modulated with a reference signal. The child unit has a transceiver including a receiver for receiving the signal generated by the parent unit and demodulating the reference signal. The child unit then uses the reference signal to modulate the rf signal of its transmitter. The parent unit includes a receiver for receiving and demodulating the signal transmitted by the child unit. The distance between the two units is determined by the parent unit as a function of the difference in phase of the transmitted and received reference signals.

The phase delay between these two signals is caused by the time it takes the signal to travel from the parent unit to the child unit and back to the parent unit (with additional phase delay caused by the circuitry of each unit). Since the internally-caused phase delay may be kept constant, the phase difference is an accurate means of determining distance. The parent transceiver unit determines the distance and generates an alarm signal when the distance is greater than a preset threshold. Such a system is thus suited for use by a parent in monitoring the proximity of a child. In a preferred embodiment of the invention, the child unit is portable and small enough to be worn comfortably by a child.

Figure 1:
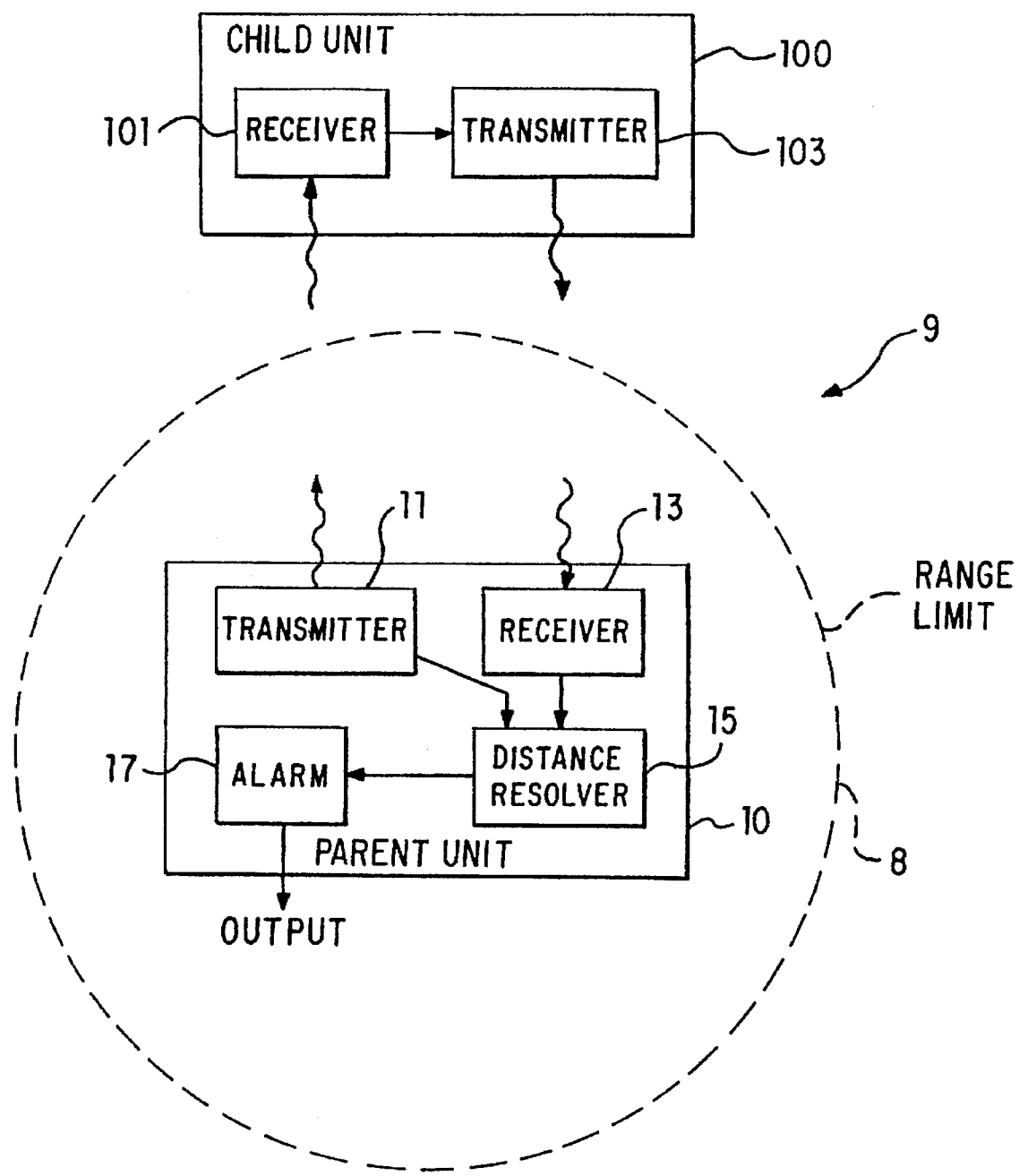
FIG. 1 is a general block diagram of an out of range alarm system according to this invention.

There is shown in FIG. 1 an out-of-range alarm system 9 according to a first embodiment of this invention. System 9 includes a parent transceiver unit 10, called the "parent unit", and a second transceiver unit 100, called the "child unit". Parent unit 10 includes a parent transmitter 11 for transmitting a first rf signal modulated with a reference signal. Child unit 100 includes receiver 101 for receiving and demodulating the reference signal transmitted by transmitter 11. The child unit 100 uses the demodulated reference signal to modulate the rf signal of transmitter 103 to transmit a second rf signal. This second rf signal is received and demodulated by receiver 13 of parent unit 10. Distance resolver 15 then compares the phase of the reference signal demodulated by receiver 13 to the phase of the reference signal transmitted by transmitter 11; the resolver 15 determines the distance between unit 10 and unit 100 based on the phase delay between the two signals. Alarm 17, in communication with distance resolver 15, generates an output alarm signal when the resolved distance is greater than a predetermined threshold. The range limit of the system 9 is represented by circle 8, centered on parent unit 10, and corresponds to the predetermined threshold associated with alarm 17.

Figure 2:
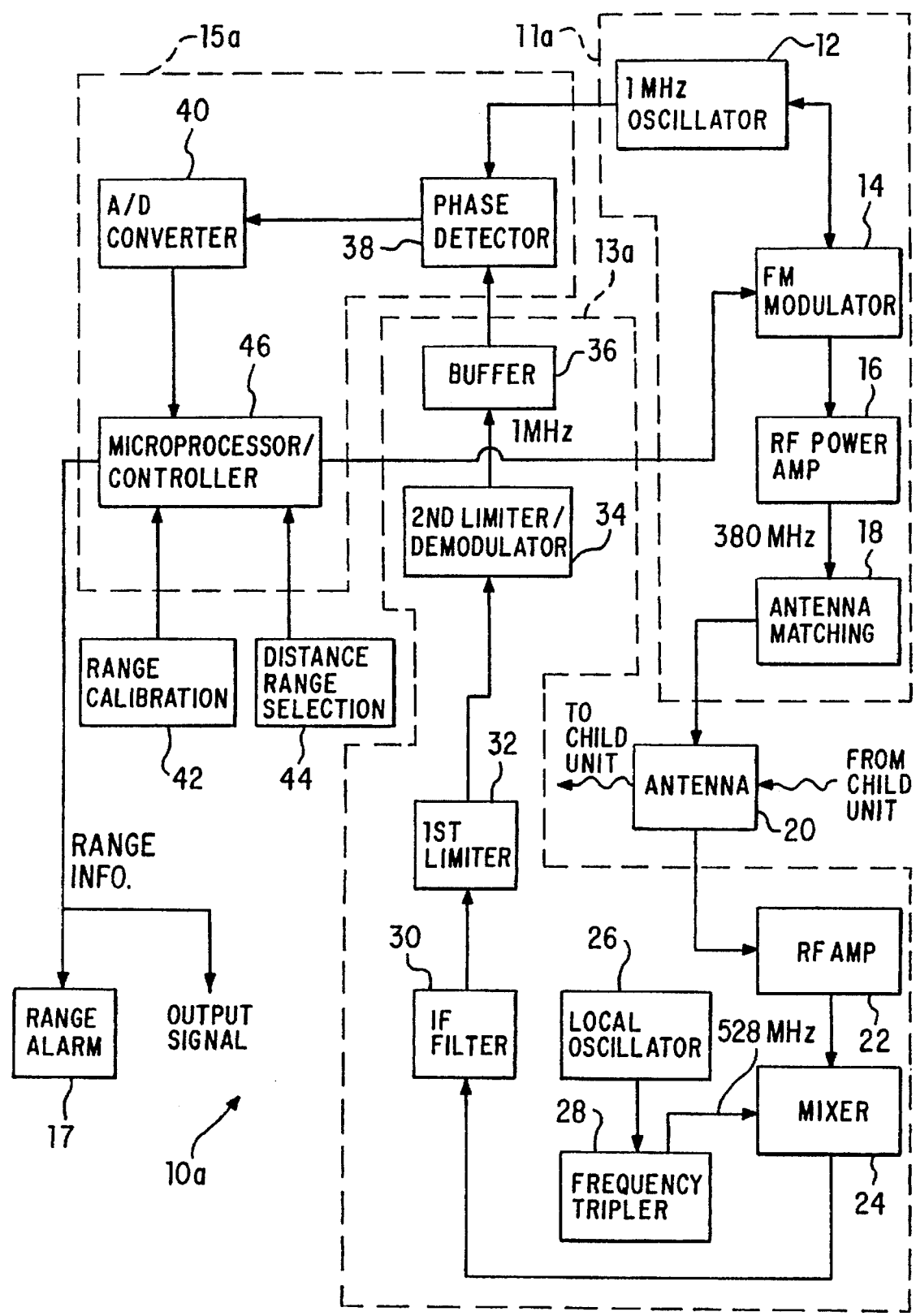
FIG. 2 is a detailed block diagram of a first embodiment of the parent unit of FIG. 1.
Figure 3:
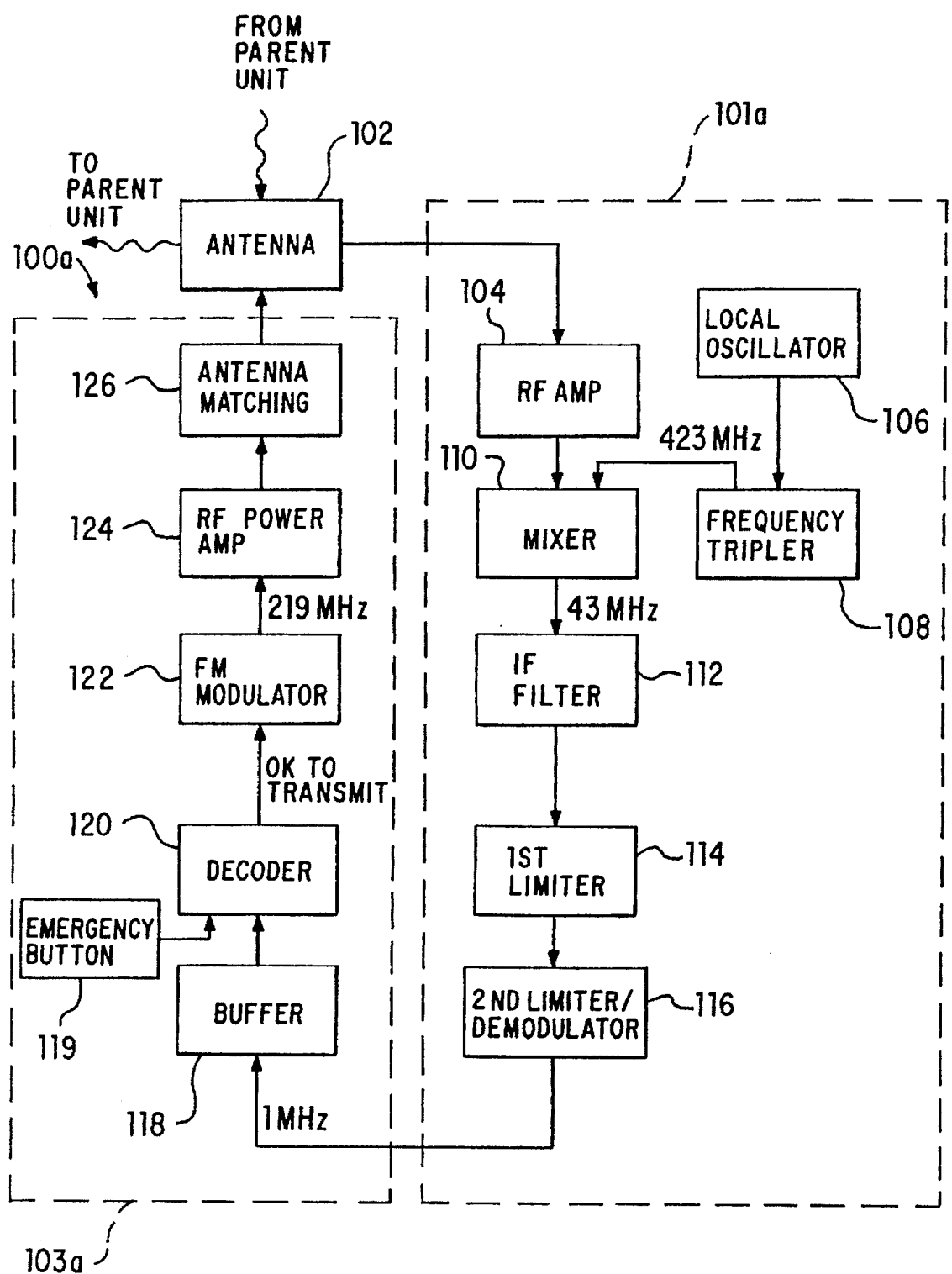
FIG. 3 is a detailed block diagram of a first embodiment of the child unit of FIG. 1.

Block diagrams of a first embodiment of the base and child units of FIG. 1 are shown in FIGS. 2 and 3 respectively. Parent unit 10a, FIG. 2, includes transmitter 11a, which includes 1 MHz oscillator 12 to provide the reference signal. The signal from this oscillator is provided to FM modulator 14, which generates a 380 MHz carrier signal and modulates the 1 MHz signal onto the carrier signal. The output from the modulator 14 is amplified by rf power amplifier 16 and provided to antenna 20 through antenna matching circuit 18.

The signal radiated by antenna 20 is received by antenna 102 of child unit 100a, FIG. 3. Receiver 101a includes RF amplifier 104 which amplifies the signal, improves the signal-to-noise ratio, and passes the signal to mixer 110. Local oscillator 106 and frequency triplet 108 together generate a 423 MHz signal which is also provided to mixer 110. The mixer 110 provides a heterodyned output signal of 43 MHz, which is filtered by IF filter 112, amplified by first limiter 114, and further amplified and demodulated by second limiter/demodulator 116. The limiter/demodulator 116 recovers the 1 MHz reference signal that was originally generated by the parent unit.

This demodulated 1 MHz reference signal is provided to transmitter 103a, which includes buffer 118 for filtering the signal, and decoder 120 (which is a small microprocessor) for ensuring that the signal received by the child unit is generated by the parent unit which matches the child unit. In other words, there is a risk of potential interference from other systems, each other system having a parent unit and one or more child units. This encoding is used to eliminate interference from other similar systems operating in the vicinity of the units comprising this system.

The encoding may be accomplished in the parent unit 10a of FIG. 2 by using microprocessor/controller 46, which is in communication with modulator 14, to rapidly turn the 1 MHz reference signal on and off during the first portion of each transmission. In addition, the microprocessor/controller 46 may be used to reduce power drain by pulsing the rf power amplifier 16 to turn on for 1/10th of a second each second; such pulsing must be timed to avoid interference with the encoding.

Returning now to the child unit in FIG. 3, decoder circuit 120 looks for the transmitted code, to determine whether the transmitted code matches internally stored criteria, including an address identifying both the parent and child units. If the criteria are matched, the decoder 120 allows the child unit to turn on its transmitter for the remainder of the parent unit's signal transmit duration. This "okay to transmit" signal is provided to FM modulator 122, which remodulates the 1 MHz signal onto a 219 MHz carrier signal. The modulated signal is amplified by rf power amplifier 124 and provided to antenna 102 through antenna matching circuit 126. This signal is then transmitted by antenna 102.

Emergency button 119 can be pushed by the wearer to generate an alarm signal for transmission to the parent unit. In this manner, the wearer can contact the parent unit monitor if necessary.

The signal transmitted by antenna 102 is received by receiver 13a of parent unit 10a, FIG. 2. Receiver 13a recovers the 1 MHz signal in a manner similar to the manner in which the child unit recovered the 1 MHz signal. Reference signal recovery is accomplished with rf amplifier 22, mixer 24, which receives a 528 MHz signal from frequency tripler 28 the fundamental of which is generated by local oscillator 26. The resulting 43 MHz signal is filtered by IF filter 30, amplified by first limiter 32, and further amplified and demodulated by second limiter/demodulator 34. The output signal from second limiter/demodulator 34 is the 1 MHz signal that was received by antenna 20.

The recovered reference signal, after filtering by buffer 36, is passed to phase detector 38, which is part of distance resolver 15a. Phase detector 38 also receives the original 1 MHz signal from oscillator 12, and compares the phase of the signal from buffer 36 to the phase of the signal from oscillator 12. Because of the time delay caused by the signal traveling from the parent unit to the child unit, and back, the recovered reference signal provided by buffer 36 will be out of phase with the reference signal provided by oscillator 12 by an amount that is a function of the distance traveled (and fixed system delays). The output of the phase detector is a DC voltage which is digitized by analog-to-digital converter 40, and then processed into distance information by microprocessor/controller 46. The distance information provided at the output of microprocessor/controller 46 is provided to range alarm 17, which outputs an alarm signal if the measured range exceeds the threshold selected by the user through distance range selection switch 44. The alarm may also be sounded if the child unit "emergency" button had been pressed. Microprocessor/controller 46 also serves as the timing controller and code generator for parent unit 10a. It also controls modulation by modulator 14, and also can mute the modulation if desired.

This scheme thus is able to determine the distance between the two units without relying on signal strength attenuation as a means of determining the distance. Since the phase delay is the result only of fixed delays attributable to the internal circuitry of the system and the distance between the two units, the phase delay provides an accurate means for determining the distance between the units. The amount of phase delay introduced by the circuitry in each unit can be effectively canceled by calibrating the units when they are a known distance apart, using range calibration switch 42. As an example of range calibration, the operator may be instructed to separate the child and parent units by a certain amount, for example 20 feet. Range calibration switch 42 can then be pressed to enable a transmission, retransmission, and receipt cycle. Since the distance is known, all phase delay that is in addition to the delay caused by the distance must be caused by internal circuits. This system delay may then be stored and subtracted from the measured delay, during use of the system, by microprocessor/controller 46 from A/D converter 40, so that the range information provided by the microprocessor/controller 46 is accurate.

Power for both units is supplied using AA batteries, not shown. An on/off switch, not shown, is also provided for each unit to conserve battery power when the units are not in use.

Figure 4:
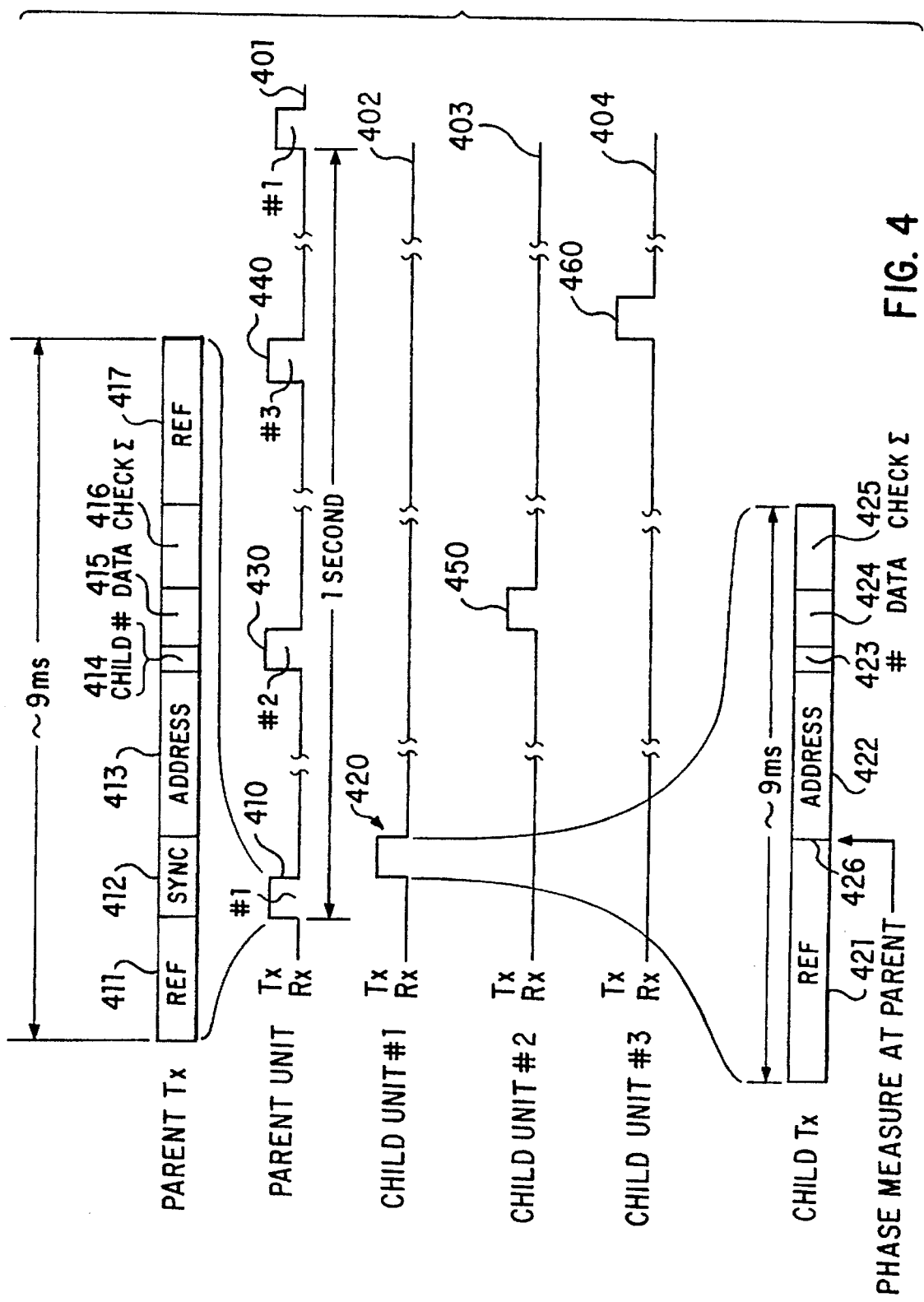
FIG. 4 is diagram showing the timing of signals associated with a second and preferred embodiment of the present invention.
Figure 5:
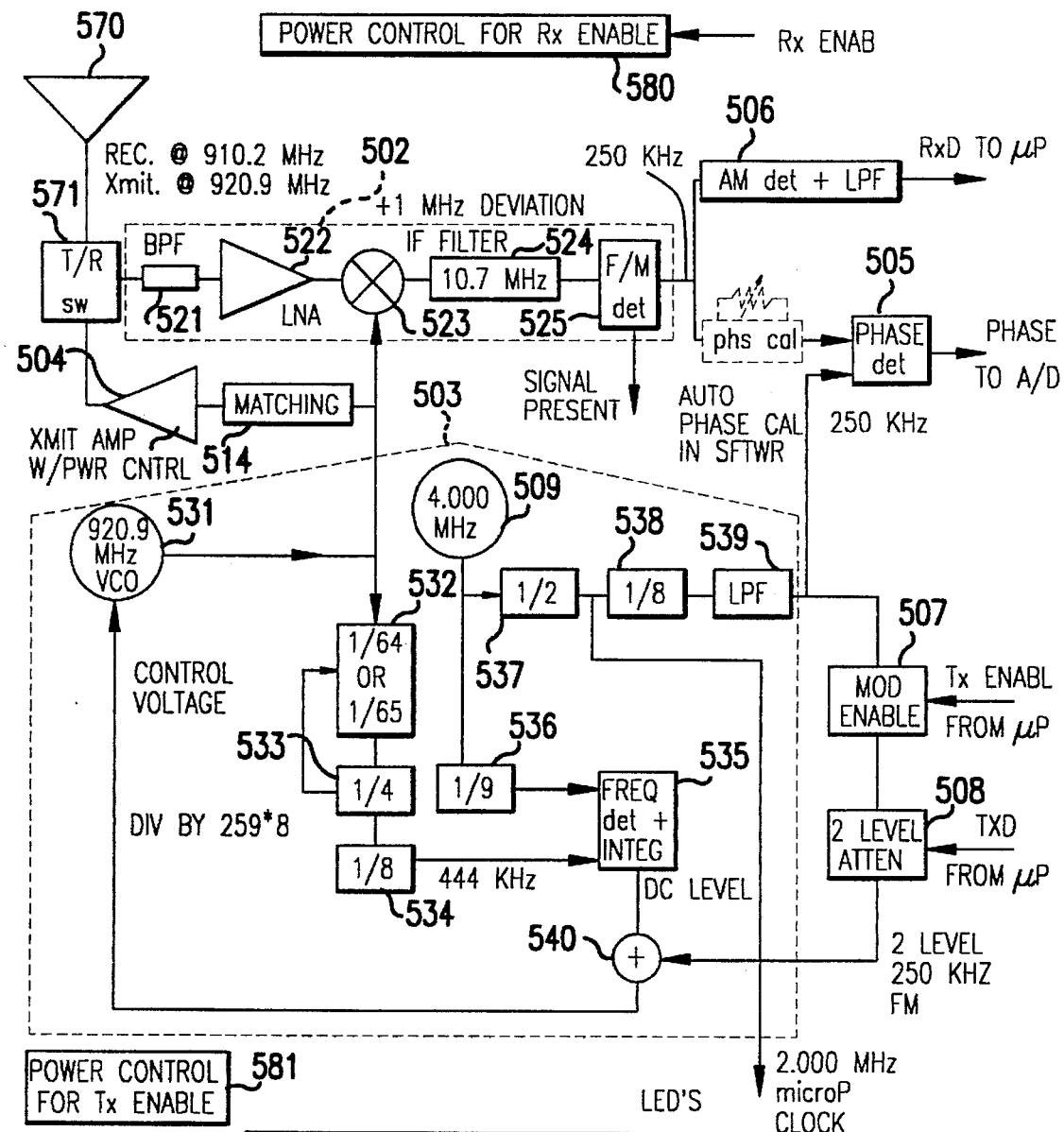
FIG. 5 is a block diagram showing a parent unit in accordance with the preferred embodiment of FIG. 4.
Figure 6:
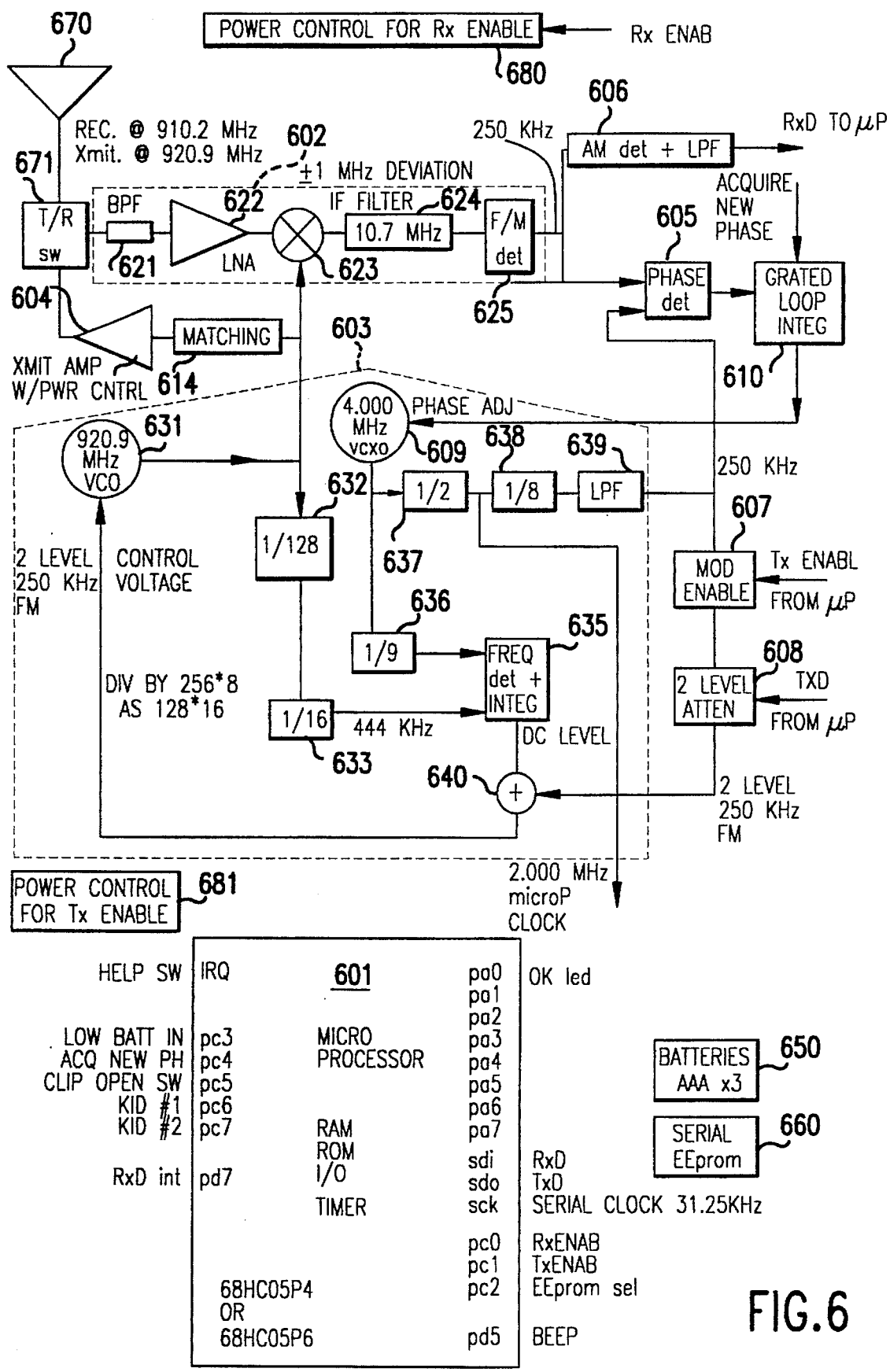
FIG. 6 is a block diagram showing a child unit in accordance with the preferred embodiment Of FIG. 4.

FIG. 4 is diagram showing the timing of signals associated with a second and preferred embodiment of the present invention. The parent transmissions are in short packets, and after each transmission, the parent unit is in the receive mode. The transmitted response from each child unit occurs after the parent has finished transmission of its packet, and the system is configured so that only one unit at time is transmitting. (FIGS. 5 and 6 show how this embodiment is implemented in circuitry.) In this embodiment, it is assumed for sake of example that there are three child units associated with a parent unit. The parent unit and each child unit are programmably encoded (using EEPROMs) with a unique and random system address to identify this particular group of units. In addition, each child unit has a switch-selectable numerical identifier to distinguish one child unit from another in the system.

This embodiment provides enhanced data exchange between the parent unit and each child unit. For example, the embodiment permits one to push a "call" button on the parent unit to cause the child unit to issue a "call" signal. The parent unit automatically informs the child unit if the child unit has exceeded the distance threshold; if the "call" button on the parent unit is pushed when the child unit has exceeded the distance threshold, the "call" signal is automatically made to sound more urgent. The parent and any child unit also may be placed in a special "adoption" mode during which the child unit will adopt the system address of the parent, and the parent unit will measure and store the system delays for the particular child unit, on the assumption that the units are placed near one another. The adoption mode is entered and maintained on a parent unit by holding the "call" button for four seconds and continuing to hold it; the adoption mode is entered and maintained on a child unit by holding the "help" button for four seconds and continuing to hold it. The adoption will not occur unless both the parent unit and the child unit are maintained in the adoption mode simultaneously. At the conclusion of the adoption, the parent unit will inform the child unit that the adoption was successful, whereupon both units emit long beeps and turn off. Also the child unit informs the parent unit if the attachment clip (for attaching the child unit to clothing of a subject) has been opened. Each unit can also inform the other of a low battery status, which can be used to trigger additional alarm signals. Finally, if the child unit attachment clip has been opened, and the parent unit has gone into an alarm state, the parent unit can tell the child unit when to turn off; the parent unit signal is generated when the user of the parent unit holds down a "mute" button for four seconds.

The parent unit has selectable distance thresholds. Four choices are provided: 15 feet, 30 feet, 60 feet, and 100 feet. The choice is selected by pushing a "set distance" button on the parent unit and displayed by lighting an appropriate LED in an array of five LEDs. (The fifth LED, identifying distance beyond 100 feet, is used only to identify a child unit that is beyond 100 feet.) If a child is beyond the set threshold, a second LED in the array is caused to blink to indicate the distance range between the parent and the child unit. For example, if the range is set to 15 feet, the 15 feet LED is turned steady on; if furthermore, the 30 feet light is blinking, the child unit is between 15 and 30 feet from the parent unit. The rate of blinking increases as the distance between units increases. A beep tone is also sounded by the parent, and the rate of repetition of the beep is indicative of distance between units. In addition, an LED in another array of three LEDs in the parent unit is caused to blink to show which unit (identified by number) is out of bounds. During this time, the out-of-bounds child unit emits a distinctive out-of-bounds beep. To save power, if no child unit is out of bounds, the selected threshold LED and the LED corresponding to each child unit being monitored are caused to blink with a slow repetition rate; no beep is emitted. This "OK" blink is distinct from the out-of-bounds blink, so there is no confusion. Each child unit is also provided with an LED to indicate that it is in communication with the parent unit.

All of these additional features are achieved by utilization of a microprocessor in each of the parent unit and the child units, making it possible to add new features, limited only by the imagination of the designing engineer.

In FIG. 4, line 401 identifies segments in time when the parent unit is in a transmit mode (identified as "Tx") or in a receive mode (identified as "Rx"). Similarly, lines 402, 403, and 404, identify the timing of transmit and receive modes for child units 1, 2, and 3 respectively. When the parent unit is in a transmit mode it transmits an rf carrier (at 920.9 MHz) that is frequency modulated with a reference signal (here at 250 kHz), as described generally above in connection with the first embodiment. The reference signal is digitally encoded with information in the format illustrated in FIG. 4. Transmission 410, for example, is addressed to child unit number 1. Transmissions 430 and 440 are addressed to child units 2 and 3 respectively. Thereafter the transmission sequence repeats, and child unit 1 is again addressed. The repeat interval is here implemented at 1 second for each child unit; that is, each child unit is interrogated once each second. The duration of each transmission (by either the parent unit or the child unit) is of the order 9 milliseconds. The data rate for the encoded information is approximately 31.25 kilobits per second.

Each transmission by the parent includes five bytes of information, preceded and followed by the unencoded reference signal. An expanded view of transmission 410 in FIG. 4 shows that, following the unencoded reference signal segment 411, the first byte of information is a sync byte 412 for bit synchronization of the information. The second and third bytes comprise the 16-bit address 413 for this particular system. (This address constitutes the digital signature for the system.) The fourth byte is the child number identifier 414, and additional data 415 for the particular child unit. The additional data may be, for example, (i) that the parent unit is calling the addressed child unit; (ii) that the addressed child unit is beyond the distance threshold; (iii) that the parent unit's 'call' button has been depressed for 4 seconds and is continuing to be depressed, so that the parent unit is in the adoption mode; (iv) that the parent unit has adopted the addressed child unit; (v) that the parent unit mute button has been held down for four seconds, thereby instructing the alarming child to turn off; and (vi) that the parent unit has a low battery. The fifth and final byte is a check sum 416, followed by a segment 417 of unencoded reference signal.

Each child unit has a transmission segment (operating at 910.2 MHz) as well, represented by items 420, 450, and 460 for child units 1, 2, and 3 respectively. An expanded view of transmission 420 in FIG. 4 shows that, following the unencoded reference signal segment 421, the first and second bytes of information comprise the 16-bit address 422 for this particular system. The third byte is the child number identifier 423, and additional data 424 from the particular child unit. The additional data may be, for example, (i) that on the child unit the "help" button has been pressed to call the addressed parent unit; (ii) that the attachment clip of the child unit has been opened; (iii) that the "help" button has been depressed for 4 seconds and is continuing to be held, putting the child unit in the adoption mode; (iv) that the child unit has a low battery. The fourth and final byte is a check sum 425.

The transmit frequencies of the parent and child units of this embodiment are chosen to fall in the 902–928 MHz band. The frequencies are also selected to be nominally 10.7 MHz apart, to facilitate use of low cost components in the IF stage and to eliminate an up-converter for transmission. In addition, this frequency band permits more ready compliance with FCC Part 15 requirements. Furthermore, low-cost rf components may be used due to the proximity of cellular telephone bands and readily available components for cellular telephones. Efficient antenna geometry in this band is small enough to be readily implemented using printed circuit traces and facilitating compact equipment.

FIGS. 5 and 6 are block diagrams showing a parent unit and a child unit respectively in accordance with the preferred embodiment of FIG. 4. Each of these units operates under control of a microprocessor 501 and 601 respectively. The processor is here a Motorola 68HC05P6, which includes internal program ROM, which holds the program for the processor. The program in each microprocessor is written to implement the signal timing and other features, discussed in connection with FIG. 4, in a manner well known in the art. This processor also includes RAM for program variables; static I/O to read switches, to light LEDs, to control power, and generate beep tones; A-to-D converter inputs for battery voltage and phase delay information; and serial I/O for transmit and receive data exchange and EEPROM I/O. (The child unit may optionally employ a less expensive Motorola 68HC05P4, provided that a comparator is used to determine low battery voltage.)

The parent unit transmits in segments having the content described above in connection with segment 410 of FIG. 4. The reference signal is used to FM modulate the rf carrier transmitted by the parent unit, and after being regenerated and retransmitted by a child unit, is demodulated by the parent unit; the phase delay between the original reference signal and the demodulated received signal is used to determine the distance between the units. The original reference signal is produced by the parent unit's frequency synthesizer 503. The reference signal is derived from crystal oscillator 509 (4.000 MHz) and divider chain 537 (1/2), 538 (1/8) and optional low pass filter 539. This signal is used to modulate an rf carrier in the manner described below.

The rf carrier utilized in the parent unit operates at the mixing frequency present as an input to the mixer 523 (used in the receiver 502), which is provided to the transmitter amplifier 504 via matching network 514. The rf transmit carrier (as well as the mixing signal) is derived from the same frequency synthesizer 503 that is used to generate the reference signal. A phase-locked loop is used to generate the mixing frequency and rf transmit carrier, and consists of voltage-controlled oscillator (VCO) 531, divider chain (resulting in division by the product of 259 * 8) 532 (switchable between 1/64 and 1/65), 533 (1/4), and 534 (1/8), frequency/phase detector-with-integrator 535, and summer 540. This loop causes the frequency VCO 531 to be slaved to an appropriate non-integral multiple (2072/9) of the crystal oscillator 509 signal (4.000 MHz), which is provided through divider (1/9) 536 to the frequency/phase detector-with-integrator 535.

During transmission by the parent unit, frequency modulation of the carrier is achieved by adding a modulation signal via summer 540 to the input of VCO 531. The modulation signal is derived from the reference out at low pass filter 539, which is gated by modulation enable switch 507 and subjected to level control by data modulator circuit 508. The data modulator 508 digitally encodes the reference signal with information in the format shown in connection with transmission segment 410 of FIG. 4. The summer 540, the data modulator circuit 508, and the modulation enable switch 507 are designed so that the center frequency of the transmit carrier is not affected by the data modulation. (It is apparent from this discussion that the summer 540 receives a DC input from the frequency/phase detector-with-integrator 535 and the small modulating digitally encoded ac signal on the other input.)

Each unit has a receiver section 502 and 602 respectively, to receive an rf signal from antenna 570 and 670 respectively, coupled through transmit-receive switch 571 and 671 respectively. The receiver, in each case, includes band pass filter 521 and 621 respectively, low noise amplifier 522 and 622, mixer 523 and 623 respectively. The mixer 523 and 623 hetrodynes the received rf signal with a local oscillator signal from frequency synthesizer 503 and 603 respectively, to produce a 10.7 MHz IF signal (albeit of wider bandwidth than commercial FM broadcasts), permitting use of low-cost conventional components for signal handling. The IF output of the mixer 523 and 623 respectively is fed to wide-band IF amplifier-filter 524 and 624, integrated limiter-filter-FM-demodulator 525 and 625 respectively.

The demodulated signal output from the receiver 502 and 602 runs to an AM detector and low pass filter 506 and 606, to provide serial digital information described in reference to transmitted segments 410 and 420 of FIG. 4. This digital information is fed to the "R×D" input of microprocessor 501 and 601 respectively. In the child unit of FIG. 6, the microprocessor 601 utilizes the data transition in sync byte 412 (of FIG. 4) to optimize bit synchronization for the serial data transfer, so as to conform to limitations of the microprocessor in handling the data stream. In this implementation, the serial data (R×D) is connected not only to the normal serial port sdi but also to port pd7. The input to port pd7 is sampled in a tight software loop to identify the sync timing, which is used to synchronize serial ports sdi and sdo. The low-cost microprocessor chosen for this embodiment does not have a conventional UART (Universal Asynchronous Receiver/Transmitter), which normally provides bit synchronization automatically.

In the child unit of FIG. 6, the demodulated reference signal is used to adjust the phase of the synthesized local reference signal derived by frequency synthesizer 603 from voltage-controlled crystal oscillator (VCXO) 609. The phase adjustment is achieved by utilizing a phase-locked loop consisting of phase detector 605, gated loop integrator 610, coupled to the VCXO 609, and divider chain 637 (1/2), 638 (1/8), and optional low pass filter 639. The VCXO 609 runs at a nominal 4.000 MHz and has sufficient tuning range to achieve phase lock during the transmission times discussed in connection with FIG. 4. The gated loop integrator 610 is controlled by the microprocessor 601 so as to adjust the phase while receiving the parent transmission and holds that phase while the child unit transmits its reply. The VCXO 609 maintains the phase stability of the local reference, required for system accuracy, during the short time of the child unit's transmission segment.

The phase-adjusted local reference signal produced by the child unit's frequency synthesizer 603 is shown as the output of low pass filter 639. In a manner generally analogous to operation of the parent unit, this signal is used to FM modulate the rf carrier transmitted by the child unit. The child unit utilizes an rf carrier at the mixing frequency present as an input to the mixer 623, which is provided to the transmitter amplifier 604 via matching network 614. The mixing signal (as well as the rf transmit carrier) is derived from the same frequency synthesizer 603 that is used to generate the local reference signal, albeit with a different phase-locked loop. The loop used to generate the mixing frequency and rf transmit carrier consists of voltage-controlled oscillator (VCO) 631, divider chain 632 (1/128) and 633 (1/16), frequency/phase detector-with-integrator 635, and summer 640. This loop causes the frequency VCO 631 to be slaved to an appropriate non-integral multiple (2048/9) of the VCXO 609 signal, which is provided through divider (1/9) 636 to the frequency/phase detector-with-integrator 635.

The child unit is programmed to expect receipt of the proper address (the system number given during the adoption process), child unit number (its own child number), data, and checksum in the format shown for segment 410 of FIG. 4. If the data received and sent to the microprocessor via the RxD input conforms to these expectations, the microprocessor initiates transmission sequence and causes illumination of the OK LED via terminal pa0 of the microprocessor. If the data does not correspond to expectations (as in the case if addressed to a different child unit or a different system address), then transmission is not enabled.

During transmission by the child unit, frequency modulation of the carrier is achieved by adding a modulation signal via summer 640 to the input of VCO 631. The modulation signal is derived from the local reference out at low pass filter 639, which is gated by modulation enable switch 607 and subjected to level control by data modulator circuit 608. The data modulator 608 digitally encodes the local reference signal with information in the format shown in connection with transmission segment 420 of FIG. 4. The summer 640, the data modulator circuit 608, and the modulation enable switch 607 are designed so that the center frequency of the transmit carrier is not affected by the data modulation. (It is apparent from this discussion that the summer 640 receives a DC input from the frequency/phase detector-with-integrator 635 and the small modulating digitally encoded ac signal on the other input.)

We have already discussed above the operation of receiver 502 of the parent unit in FIG. 5, which provides a data input to the microprocessor 501 from the AM detector and low-pass filter 506. Synchronization by the microprocessor of the received data is not necessary in the parent unit, because the child unit matches the parent unit's synchronization. In addition the receiver output from integrated limiter-filter-FM-demodulator 525, which provides the demodulated reference signal received from the child unit, is given as an input to phase detector 505. A second input to the phase detector is the parent reference signal that is generated by its frequency synthesizer 503. The output of the phase detector 505, which is a function of the distance between the parent and child units, is provided to an A-to-D input of the microprocessor 501.

The microprocessor 501 samples this phase after having received a few milliseconds of the demodulated child reference signal. The point of sampling is indicated in FIG. 4 as item 426. This timing is determined open loop by the parent microprocessor 501 based on the timing periods shown in FIG. 4, and is fixed in relation to the time of transmission by the parent unit. At this time the parent microprocessor has not determined if the phase delay has produced a valid distance measurement. The parent unit is programmed to expect receipt of the proper address, child unit number, data, and checksum corresponding to the child unit being interrogated. If the data received and sent to the microprocessor via the RxD input conforms to these expectations, the microprocessor accepts the distance measurement as valid. The distance measurement is then further processed by the microprocessor to deal with system phase delay and multipath phenomena as follows:

(i) subtract the distance, attributable system phase delay, stored during the adoption process, to yield a current distance value;

(ii) compare the current distance value to the distance determined at the end of the previous measurement cycle;

(iii) if the difference resulting from the comparison is indicative of an amount of relative movement of the parent unit and the child unit outside a prespecified window (having a maximum and a minimum, and taking into account, for example, typical human walking speeds during the 1 second sampling intervals in FIG. 4), then limit the newly determined distance to the appropriate window maximum or minimum;

(iv) use the limited distance measure from step (iii) to determine in which of the five distance ranges the applicable child unit happens to fall;

(v) debounce the range determination of step (iv) using standard software debouncing techniques;

(vi) check the debounced range resulting from step (v) against the selected range limit, and take appropriate alarm actions as necessary in accordance the operation of the system described above, including establishing if necessary a beep rate determined on the basis of the limited distance measure from step (iii).

Of course, other smoothing algorithms may be used. Note that the distance range LEDs are directly connected to microprocessor 501, preferably with a resistor to limit the current, at terminals pa0, pa1, pa2, pa3, and pa4. The child unit number LEDs are similarly connected at terminals pa5, pa6, and pa7.

As will be apparent from FIGS. 5 and 6, the units rely on power from three AAA batteries 550 and 650, store system parameters (including system address and calibration data) in serial EEPROM 560 and 660. Power management for transmission enable is controlled by blocks 581 and 681 and for receiver enable by blocks 580 and 680 respectively. Because a unit can determine when to expect the arrival of the next transmission (owing to use of the timing arrangement described in connection with FIG. 4), the microprocessor can conserve system power by turning off the receiver each measurement cycle until just before the receiver is needed. If receiver circuit elements are required for proper microprocessor operation (such as oscillator 509 or 609 and divider chain 537 and 637 used to derive the microprocessor clock), these elements must of course remain powered. The use of this power management scheme will impact the required settling times of the various phase locked loops used in the system, a factor that should be taken into account in component selection for these loops if power management is used.

It has been assumed in the discussion above for FIGS. 4–6, that each child unit has acquired the timing of the parent transmission cycle. An acquisition mode is necessary for the child unit to achieve coordination with the parent unit's timing cycle. The acquisition mode requires the child unit to operate continuously to identify the sync byte on terminal pd7 and data indicating that it has been addressed by system address and child unit number. When such addressing has been confirmed, the acquisition mode is exited and power management is commenced. In the adoption mode, the child unit accepts any system address from a parent that is also in the adoption mode. After the child unit accepts the new system address, it replies to the adopting parent unit using the new system address and sets the adoption bit in data field 424 of FIG. 4. This confirms to the parent unit that a new child unit of the system is present, and the parent unit should store in EEPROM 560 the measured system phase delay associated with this child unit.

Figure 7:
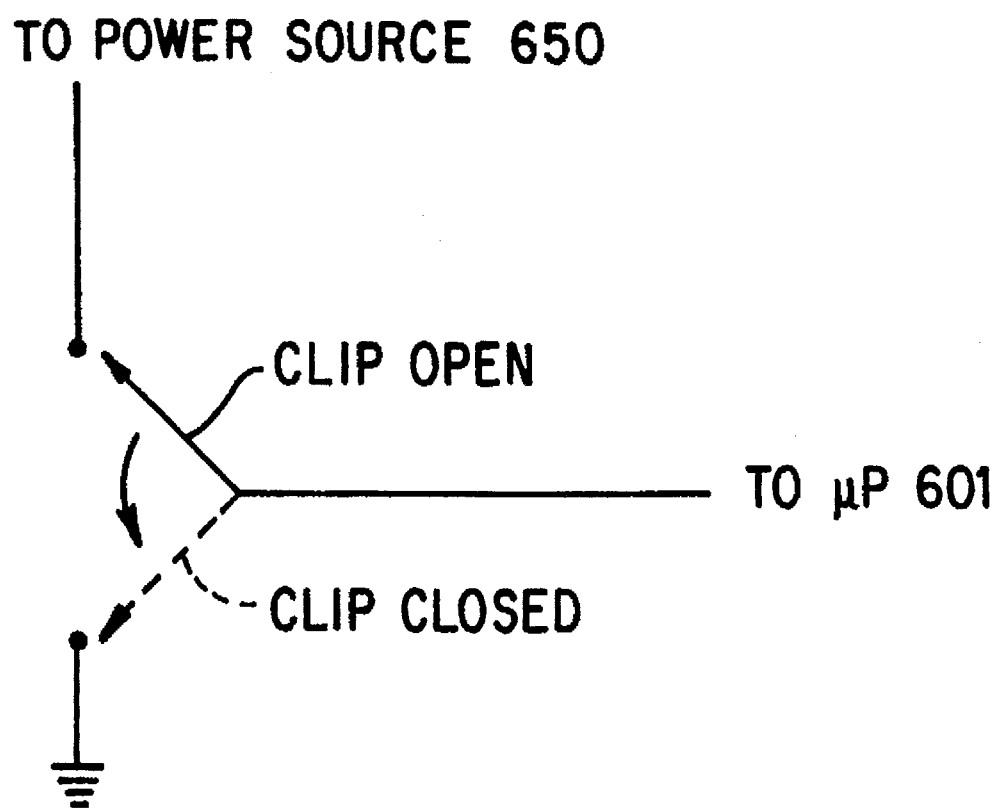
FIG. 7 is a high level schematic illustrating how a clip arrangement on the child unit is to function as a switch in communication with a microprocessor.

The parent unit of FIG. 5 may also be provided with a collision avoidance mode, which may be employed prior to the first transmission by the parent unit. In this mode, the parent unit operates its receiver and data decoding circuitry to determine whether there are present any signals from child units responding to parent unit(s) other than itself. In such a case, the parent unit will choose its first transmission segment (and therefore the repeat interval for the transmission sequence) to begin at a time tending to reduce interference with the competing system(s). In addition (or alternatively), the repeat interval may be programmed to be different from system to system, and in particular may be selected depending on the random system address selected by the parent unit (and subsequently adopted by each child unit). In this manner, interfering signals may occur occasionally but not continuously with competing systems in the same vicinity. These occasional collisions will be inherently ignored by the system design of this embodiment, owing to the use of distinct addresses, checksums, and digital signal processing described above. FIG. 7 is a high level schematic illustrating an embodiment in which the attachment clip effectively functions as a switch in communication with microprocessor 601 so that parent unit 10 is notified when the clip is opened (i.e., child unit 100 is not being worn by the child). Microprocessor 601 can be programmed so that a HIGH signal from the clip arrangement causes additional data 424 to indicate to parent unit 10 that the clip is opened. Other clip arrangements with communication to a microprocessor are well known in the art.

It will be apparent from this discussion that the alarm and distance resolver, as well as encoders, decoders, and inhibitor arrangements for preventing transmission, may be realized either in discrete hardware components or in a microprocessor based system that has been programmed to achieve these functions.

What is claimed is:

1. A system, of the type having a plurality of transceiver units for generating an alarm when a child transceiver unit is more than a predetermined distance away from a parent transceiver unit, the system comprising:

(a) a first transmitter portion, disposed in a parent unit, the first transmitter portion having:

(i) a first rf transmitter, operative at a first carrier frequency, having an output;
      (ii) a signal generator for generating a first reference signal;
      (iii) a first modulator, coupled to the first rf transmitter, for modulating the first carrier with the first reference signal; and
      (iv) a first digital encoder for digitally encoding the modulated carrier with a digital signature to identify the output of the first transmitter;

(b) a portable child unit, of a size permitting it to be worn by a human subject, including by a child, having:

(i) a second receiver, tuned to the first carrier frequency, for receiving a signal broadcast from the output of the first transmitter;
      (ii) a digital decoder for decoding the digital signature from the signal received by the second receiver and providing a decoded output;
      (iii) an inhibitor arrangement, coupled to the digital decoder, for preventing transmission by the child unit unless the decoded output meets criteria stored in the child unit;
      (iv) a second rf transmitter, operative at a second carrier frequency, and having an output; and
      (v) a second modulator, coupled to the second rf transmitter and to the second receiver, for modulating the second carrier with a second reference signal having a phase relationship to the first reference signal as received by the second receiver; and (c) a first receiver portion, disposed in the parent unit, the first receiver portion having:

(i) a first receiver, tuned to the second carrier frequency, for providing an output of the demodulated second reference signal;
      (ii) a distance resolver, coupled to the first receiver and the signal generator, for providing an output signal dependent on the phase relationship, between the first reference signal and the demodulated second reference signal, that is indicative of the distance between the child unit and the parent unit; and
      (iii) an alarm, coupled to the distance resolver, triggered if the output signal from the distance resolver exceeds a specified maximum distance.

2. A system according to claim 1, wherein the first modulator is an FM modulator, and the second modulator is an FM modulator.

3. A system according to claim 2, wherein the child unit further has an emergency button for causing the generation of an alarm signal for transmission to the parent unit.

4. A system according to claim 2, wherein the parent unit further has a range selection switch accessible to the user for specifying the maximum distance.

5. A system according to claim 2, wherein the child unit has:

a demodulator associated with the second receiver for providing the demodulated first reference signal;
   a tunable second reference oscillator; and
   a phase-locked loop, for locking the tunable second reference oscillator to the demodulated first reference signal, so as to generate the second reference signal.

6. A system according to claim 5, wherein the phase lock loop further includes:

a frequency detector and integrator having an output; and
   a summer with a first input, a second input, and an output indicative of the sum of the first and second inputs of the summer to tune the tunable second reference oscillator, wherein the first input of the summer receives the output of the frequency detector and integrator and the second input of the summer receives a modulation signal.

7. A system according to claim 6, wherein the second carrier has a center frequency substantially unaffected by the modulation signal.

8. A system according to claim 2, wherein the parent unit and the child unit each have an adoption mode, which, when enabled simultaneously by both units, causes the child unit to store the digital signature of the parent unit as part of the criteria stored in the child unit.

9. A system according to claim 1, wherein the child unit further has an emergency button for causing the generation of an alarm signal for transmission to the parent unit.

10. A system according to claim 1, wherein the parent unit further has a range selection switch accessible to the user for specifying the maximum distance.

11. A system according to claim 1, wherein the child unit has:

a demodulator associated with the second receiver for providing the demodulated first reference signal;

a tunable second reference oscillator; and a phase-locked loop, for locking the tunable second reference oscillator to the demodulated first reference signal, so as to generate the second reference signal.

12. A system according to claim 1, wherein:

the parent unit includes a first arrangement to cause the parent unit to alternate, in the course of a repeating interval, between operation of the first transmitter and the first receiver, and the child unit includes a second arrangement to cause the child unit to alternate, in the course of the repeating interval, between operation of the second receiver and the second transmitter, so that the parent unit operates its first transmitter when the child unit operates its second receiver and the parent unit operates its first receiver when the child unit operates its second transmitter, and the distance resolver provides a new output signal indicative of the distance once for each repeating interval.

13. A system according to claim 12, further comprising:

a plurality of child units, each child unit having stored therein a different set of criteria, including an address, in its inhibitor arrangement, so that each child unit may be uniquely addressed;

and wherein the digital signature provided in the first digital encoder in the parent unit includes the address of a unique child unit, and the parent unit includes a sequencer for modifying the digital signature in successive broadcasts by the first transmitter so as to cause the parent unit to address each child unit individually over the course of a repeating interval.

14. A system according to claim 13, wherein the parent unit and the child unit each have an adoption mode, which, when enabled simultaneously by both units, causes the child unit to store the digital signature of the parent unit as part of the criteria stored in the child unit.

15. A system according to claim 12, wherein the first arrangement is configured in such a manner that the aggregate time consumed by transmission by the parent unit and each of the child units during a repeating interval is small in comparison to the duration of the repeating interval, so as to reduce potential interference caused by similar parent units and child units, transmitting on the same frequencies, that are not part of the system.

16. A system according to claim 15, wherein the parent unit has a collision detector for determining whether there is present a signal from a child unit responding to a parent unit other, than itself, and in such case, adjusting at least one of the onset or duration of a repeating interval to reduce potential interference.

17. A system according to claim 15, wherein the parent unit has means for randomly assigning its digital signature.

18. A system according to claim 17, wherein the parent unit has means for establishing the duration of its repeating interval as a function of its digital signature so as to reduce potential interference.

19. A system according to claim 15, wherein the parent unit has means for establishing the duration of its repeating interval as a function of its digital signature so as to reduce potential interference.

20. A system according to claim 15, wherein the parent unit and the child unit each have an adoption mode, which, when enabled simultaneously by both units, causes the child unit to store the digital signature of the parent unit as part of the criteria stored in the child unit.

21. A system according to claim 15, wherein the parent unit has an arrangement for indicating the approximate distance between it and the child unit determined to be beyond the specified maximum distance.

22. A system according to claim 21, wherein the parent unit has an arrangement for indicating which, if any, child unit is beyond the specified maximum distance.

23. A system according to claim 15, wherein the parent unit has an arrangement for indicating which, if any, child unit is beyond the specified maximum distance.

24. A system according to claim 12, wherein the child unit also includes an alarm automatically enabled by the parent unit when the distance resolver output exceeds the specified maximum distance.

25. A system according to claim 12, wherein the parent unit also includes a switch to initiate a call signal that is enabled on the child unit.

26. A system according to claim 12, wherein the child unit has an attachment clip, sensing means for sensing opening of the attachment clip, and means for signalling to the parent unit that the sensing means has sensed opening of the attachment clip.

27. A system according to claim 12, wherein at least one of the parent unit and the child unit includes means for signalling the presence of effective communication with the other of the parent unit and the child unit.

28. A system according to claim 12, wherein each of the parent unit and the child unit includes means for signalling the presence of effective communication with the other.

29. A system according to claim 12, wherein the first carrier frequency and the second carrier frequency lie in the 902–928 MHz band.

30. A system according to claim 1, wherein the parent unit and the child unit each have an adoption mode, which, when enabled simultaneously by both units, causes the child unit to store the digital signature of the parent unit as part of the criteria stored in the child unit.

31. A system according to claim 1, wherein the child unit also includes an alarm automatically enabled by the parent unit when the distance resolver output exceeds the specified maximum distance.

32. A system according to claim 1, wherein the parent unit also includes a switch to initiate a call signal that is enabled on the child unit.

33. A system according to claim 1, wherein the child unit has an attachment clip, sensing means for sensing opening of the attachment clip, and means for signalling to the parent unit that the sensing means has sensed opening of the attachment clip.

34. A system according to claim 1, wherein at least one of the parent unit and the child unit includes means for signalling the presence of effective communication with the other of the parent unit and the child unit.

35. A system according to claim 1, wherein each of the parent unit and the child unit includes means for signalling the presence of effective communication with the other.

36. A system according to claim 1, wherein the first carrier frequency and the second carrier frequency lie in the 902–928 MHz band.

* * * * *

UNITED STATES PATENT AND TRADEMARK OFFICE
CERTIFICATE OF CORRECTION

PATENT NO. : 5,661,460
DATED : August 26, 1997
INVENTOR(S) : Sallen et al.

It is certified that error appears in the above-identified patent and that said Letters Patent is hereby corrected as shown below:

Column 13, line 38, change "When" to --when--

Column 14, line 7, delete the comma after "other"

Signed and Sealed this

Sixteenth Day of December, 1997

Attest:

BRUCE LEHMAN

Attesting Officer

Commissioner of Patents and Trademarks